United States Patent [19]

Capshew

[11] 4,391,736

[45] Jul. 5, 1983

[54] ALPHA-OLEFIN POLYMERIZATION

[75] Inventor: Charles E. Capshew, Bartlesville, Okla.

[73] Assignee: Phillips Petroleum Company, Bartlesville, Okla.

[21] Appl. No.: 270,695

[22] Filed: Jun. 5, 1981

[51] Int. Cl.$^3$ .............................. C08F 4/02; C08F 4/64
[52] U.S. Cl. ............................ 252/429 B; 252/429 C; 526/119
[58] Field of Search ....................... 252/429 B, 429 C

[56] References Cited

U.S. PATENT DOCUMENTS

| 3,152,088 | 10/1964 | Sandri et al. | 252/429 B |
| 3,168,484 | 2/1965 | Engel et al. | 252/429 C |
| 3,454,547 | 7/1969 | Delboville et al. | 252/429 C X |
| 3,718,636 | 2/1973 | Stevens et al. | 252/429 C X |
| 3,943,067 | 3/1976 | Chan et al. | 252/429 C X |
| 4,039,472 | 8/1977 | Hoff | 252/429 C |
| 4,089,808 | 5/1978 | Zucchini et al. | 252/429 C |
| 4,218,339 | 8/1980 | Zucchini et al. | 252/429 B |

FOREIGN PATENT DOCUMENTS 1401708  7/1975  United Kingdom .

Primary Examiner—Patrick Garvin

[57] ABSTRACT

A process and catalyst for the polymerization of olefins wherein the catalyst comprises the product obtained by reacting a complex of a magnesium dihalide and a tetraalkyl titanate with the product resulting from a reaction between an organometallic compound and a hydroxyl-containing carrier such as silica and then reacting that product with a titanium halide.

10 Claims, No Drawings

ALPHA-OLEFIN POLYMERIZATION

The present invention relates to the polymerization of alpha-olefins. In another aspect, the present invention relates to a novel catalyst for use in the polymerization of alpha-olefins. In still another aspect, the present invention relates to the preparation of the novel polymerization catalyst.

U.S. patent application Ser. No. 132,731, filed Mar. 24, 1980, now U.S. Pat. No. 4,363,746 by the present inventor discloses a novel high productivity olefin polymerization catalyst prepared by reacting compounds such as magnesium dichloride and a tetraalkyl titanate, then reacting a solution of that product with an organometallic compound such as ethylaluminum sesquichloride to obtain a solid and then reacting that solid with a transition metal halide ion exchanging source such as titanium tetrachloride. The disclosure of Ser. No. 132,731 indicates that a particulate diluent such as silica can be used in the catalyst system by being combined with the solid obtained prior to the treating with the halide ion exchanging source or by being combined with the solid resulting after the halide ion exchanging source.

The present invention is based upon the discovery that a catalyst having quite different properties is obtained if particulate diluent such as silica is combined with the organometal compound before said organometal compound is contacted with the solution resulting from the reaction of magnesium dichloride and tetraalkyl titanate.

SUMMARY

In accordance with the present invention, a novel polymerization catalyst is prepared by reacting a first component comprising the product of a reaction between a magnesium dihalide and a tetraalkyl titanate with a second component comprising the product of a reaction between a substantially anhydrous particulate hydroxyl-containing refractory carrier and an organometal compound of a metal of Group I to V and then reacting the resulting solid with titanium tetrahalide.

Further in accordance with the present invention, there is provided a novel method of polymerizing alpha-olefins comprising employing the novel catalyst. In an especially preferred embodiment, polymerization is carried out using an admixture of the instant inventive catalyst and a catalyst of the type disclosed in U.S. application Ser. No. 132,731, now U.S. Pat. No. 4,363,746, the disclosure of which is hereby incorporated by reference.

DETAILED DESCRIPTION OF THE INVENTION

The hydroxy-containing substantially anhydrous refractory carrier can be selected from any of the commonly used refractory carriers having hydroxylic surfaces. Examples include alumina, boria, magnesia, silica, thoria, titania, and combinations thereof such as silica-alumina, silica-titania, etc. The term "substantially anhydrous" as used in regard to the carrier is intended to denote that the carrier has been dried to remove substantially all the bound water. Silica or silica admixed with a minor amount of the other mentioned refractories are presently preferred. The carrier can be conveniently dried with dry air, dry nitrogen, etc., under fluid bed conditions typically at temperatures in the range of about 150° to about 700° with drying times in the range of about 10 minutes to about 10 hours. The carrier once dried can be stored in a dry atmosphere until ready for use in preparing the present catalyst.

The organometal compound that is reacted with the carrier is an organometallic compound of Groups I to V of the Periodic Table of the Elements. Examples include dialkylmagnesiums, Grignard reagents, lithium alkyls, diaryl zincs, and alkyl aluminas. Because of efficacy and availability, the presently preferred class of compounds are the organoaluminum compounds of the formula $$R_nAlX_{3-n}$$

wherein R is a hydrocarbyl group containing 1 to 20 carbon atoms, X is a halogen, and n is a number in the range of 0 to 3. Specific examples include trimethylaluminum, diethylaluminum chloride, eicosylaluminum dibromide, triphenylaluminum, triethylaluminum, dicyclohexylaluminum bromide, isopropenyl aluminum dichloride, ethyl aluminum sesquichloride, and tribenzylaluminum. Dialkylaluminum halides in which the alkyl groups contain 1 to 6 carbon atoms are the presently preferred organoaluminum compounds.

Preferably, the organometal compound is employed in an amount sufficient to react with all, or substantially all, of the surface hydroxyl groups of the particulate refractory carrier. Accordingly, an excess of the organometal compound is generally employed, preferably in conjunction with dry (i.e. substantially anhydrous) normally liquid hydrocarbon to insure more even contacting of the reactants. As an example, when a silica substrate is used, the molar ratio of silica to organometal compound can range from about 0.5:1 to about 10:1, preferably from about 1:1 to about 5:1.

The temperature for the reaction of the organometal compound and the hydroxyl-containing substrate is not considered critical. Typical temperatures are those in the range of about 0° C. to about 150° C. with reaction times in the range of about 1:1 to 5:1. Following this reaction, the resulting solid is isolated such as by filtration and is washed with a dry, normally liquid hydrocarbon such as n-pentane to remove unreacted organometal compound.

The preparation of the complex between tetraalkyl titanate and magnesium dihalide is disclosed in detail in the aforementioned application Ser. No. 132,731, now U.S. Pat. No. 4,363,746. Generally, the titanium compounds employed are those in which the alkyl groups each contain 1 to 20 carbon atoms, preferably about 1 to 6 carbon atoms. Specific examples include titanium tetramethoxide, titanium tetraethoxide, titanium tetra-n-butoxide, titanium tetra-n-hexyloxide, and titanium tetraeicosyloxide. The MgX$_2$ is preferably magnesium dichloride because of ready availability and particular efficacy.

The solid isolated after the reaction of the carrier and the organometal compound is then reacted with the Ti(OR)$_4$.MgX$_2$ complex. Typically, this is done by slurrying the solid in a dry, normally liquid hydrocarbon and mixing the slurry with a hydrocarbon solution of the Ti(OR)$_4$.MgX$_2$ composition. Reaction temperatures for this step are in the range of 0° C. to 150° C., more generally 15° C. to 100° C. for a time ranging from about 10 minutes to about 10 hours, more generally from about 30 minutes to about 5 hours.

The relative amounts of the solid and the Ti(OR)$_4$ complex can vary widely. When silica is used, the mole ratio of silica to Ti(OR)$_4$ is in the range of about 1:1 to about 200:1.

The solid resulting from this step is then contacted with a titanium tetrahalide, preferably titanium tetrachloride. This contacting is likewise preferably carried out in a dry normally liquid hydrocarbon to insure even contacting of the reactants. Typical hydrocarbons include n-heptane, cyclohexane, toluene, and the like. The temperatures for this step is likewise not considered critical. Convenient temperatures are in the range of about 15° C. to 100° C. for a time sufficient to improve the activity of the catalyst.

The inventive catalyst is combined with a cocatalyst for best results in olefin polymerization. The preferred cocatalysts are those typically used in polymerizations using titanium-based catalysts. Examples include the organoluminum compounds of the formula $R_nAlX_{3-n}$ as defined previously. Triethylaluminum is currently the preferred cocatalyst.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

In one aspect of the present invention, the inventive catalysts are particularly useful for the polymerization of ethylene homopolymers.

The catalysts of the present invention produce a high molecular weight ethylene homopolymer of relatively broad molecular weight distribution. In contrast the high productivity catalysts of application Ser. No. 132,731, now U.S. Pat. No. 4,363,746 generally result in ethylene homopolymers having lower molecular weight and narrower molecular weight distribution. While the properties of those high productivity catalysts are particularly desirable for applications such as injection molding, a broader molecular weight distribution is often needed for blow molding and film applications. By using mixtures of the catalyst of this invention and the high productivity catalysts of that copending application, it is possible to vary the molecular weight distribution so as to produce polyethylene suitable for a particular end use.

By varying the weight ratio of the catalysts and the reactor conditions, it is possible to obtain a wide spectrum of ethylene homopolymers, typically varying from those having high load melt indexes as high as 5 to those having regular melt indexes (ASTM D 1238-65T, Condition E) in the range of 10 to 20. The mixed catalysts can also result in polymers having molecular weight distribution values as measured by the parameter HLMI/MI in the range of 35 to 80 and regular melt indexes in the range of 0.5 to 5. Generally, ethylene homopolymers having such melt indexes when produced by more conventional catalyst systems will have somewhat narrower molecular weight distributions, for example 28 to 30.

A further understanding of the present invention and its advantages will be provided by the following examples:

Example I—Catalyst Preparation

Unless specified to the contrary, all operations were conducted in a dry box containing a nitrogen or argon atmosphere, thus avoiding such catalyst poisons as oxygen and water.

A: A 10 oz (266 mL) beverage bottle containing a magnetic stirrer rod was charged with 3.62 g (0.0603 mole) of a commercially obtained, particulate, catalytic grade silica (Davison 952 grade silica). The bottle was capped, flushed with nitrogen and injected slowly with 26 mL of 0.755 molar diethylaluminum chloride (DEAC) in n-hexane (0.0196 mole). A vigorous, exothermic reaction ensued. When it was over, the bottle was capped, removed from the dry box and heated to 110° C. for 5 minutes while stirring giving a milky-white suspension. The bottle and contents were cooled to about 25° C., returned to the dry box and the contents suction filtered. The cake was washed with 60 mL of n-hexane and dried under an argon stream to yield 4.29 g of a white powder as the product. It was observed that the clear, colorless filtrate smoked when exposed to air indicating that an excess of organometal compound was employed in the reaction. The mole ratio of silica to DEAC was about 3.1 to 1.

B: A bottle equipped with a magnetic stirrer bar was charged with 9.52 g (0.100 mole) of MgCl$_2$, previously roll milled and dried under nitrogen at 200° C., 45.40 g (0.200 mole) of titanium tetraethoxide, Ti(OEt)$_4$, and 50 mL of mixed xylenes (usual commercial form). The bottle was capped, removed from the dry box, and to it was added 200 mL of the xylene solvent by syringe. Most of the MgCl$_2$ appeared to dissolve. The bottle was heated for 30 minutes, at 110° C. while stirring to complete dissolution of reactants and bottle and contents were then cooled to about 25° C. The bottle was then placed in a cold bath maintained at about $-20°$ C. to $-25°$ C. and to the chilled, stirred solution was added dropwise over a 4.5 hour period, 125 mL of a 0.783 molar solution of ethylaluminum sesquichloride (EASC) in n-hexane (0.0979 mole EASC). The mixture was stirred an additional 15 minutes at about $-18°$ C. to $-24°$ C. following the EASC addition. The bottle was then placed in an ice bath for about 15–20 minutes. The bottle contained a yellow slurry. The bottle was transferred to the dry box where the contents were suction filtered. The cake was washed with 150 mL of n-hexane and the product dried under an argon stream to afford 20.95 g of a white powder as product. The filtrate was yellow to orange in color. The mole ratio of Ti(OEt)$_4$ to MgCl$_2$ in this preparation was about 2 to 1.

C: A bottle equipped with a magnetic stirrer bar was charged with 1.9 g (0.020 mole) of MgCl$_2$ (previously described under B), 9.1 g (0.040 mole) of Ti(OEt)$_4$ and 100 mL of n-hexane. The bottle was capped and heated for 30 minutes at 100° C. while stirring to form a solution. The bottle and contents were cooled to about 25° C., returned to the dry box where the contents were filtered to remove traces of solids. The filtrate was retained for future use.

Invention Catalyst 1

The 4.29 g product of part A was treated with a solution containing 10 mL of n-hexane and some of the 2Ti(OEt)$_4$.MgCl$_2$ part C product equivalent to 0.004 mole of Ti(OEt)$_4$ and 0.002 mole MgCl$_2$. A portion of the reaction product was given an elemental analysis. See below. The calculated mole ratio of silica to Ti(OEt)$_4$ is about 150:1. The slurry was stirred for about 1 hour at 110° C., cooled, and suction filtered to yield a colorless filtrate and a yellow filter cake. The cake was transferred to a beverage bottle, mixed with 10 mL of n-hexane and the bottle capped. The bottle was removed from the dry box and to it was injected 7.7 g (0.041 mole) of TiCl$_4$. The mixture was stirred, and heated for about 1 hour at about 110° C. to 120° C. The bottle was cooled to about 25° C., returned to the dry box and the contents cake was washed with 100 mL of n-hexane and the product dried under an argon stream and then 15 minutes in a vacuum oven. Not all the dried product was recovered due to problems experienced with the oven.

Elemental analysis of 0.3645 g of the preliminary product obtained by reacting the part A product with a solution of the 2 Ti(OEt)$_4$.MgCl$_2$ complex revealed the following data:

weight percent Ti=3.22
weight percent Mg=0.69 equivalent to about 0.001 mole Mg
weight percent Al=5.07 equivalent to about 0.006 mole Al The Mg results indicate that about one-half of the Ti-Mg complex reacted with the DEAC-contacted silica since complex equivalent to 0.002 mole Mg was treated and 0.001 mole Mg was determined to be in the product. The results also suggest that since 0.006 mole aluminum (DEAC) is in the product that about 0.006/0.020 mole or about 30 percent of the DEAC reacted with the hydroxyl groups of the silica.

Comparison Catalyst 2

A beverage bottle was charged with 3.00 g of the part B product, slurried with 15 mL of n-hexane and the bottle was capped. The bottle after removal from the dry box was injected with 12 g of TiCl$_4$ and heated with stirring for 1¼ hours at 132° C. The bottle was cooled to about 25° C., returned to the dry box where the contents were suction filtered and the filter cake washed with 30 mL of n-hexane. The cake was dried under an argon stream to afford 2.71 g of a light yellow powder as comparison Catalyst 2.

Example II—Ethylene Polymerization

Ethylene was polymerized in several individual runs employing a 3.8 L (1 gal), stirred, stainless steel reactor and about 2 L of isobutane as diluent. In each run 1 mmole (1 mL9 of triethylaluminum (TEA) as a 16.3 weight percent solution of TEA in n-heptane was charged to the reactor, the catalyst was charged and the reactor was sealed. The isobutane was then charged, the reactor and contents heated to 100° C., then hydrogen and ethylene were added and the polymerization allowed to continue for 1 hour at a nominal reactor pressure of 3.55 MPa maintained by the addition of ethylene as needed. In each run the initial pressure of hydrogen was 0.45 MPa and the initial partial pressure of ethylene was 1.5 MPa.

Each run was terminated by flashing ethylene, hydrogen and isobutane from the reactor. The polymer was then recovered, dried and weighed to determined the yield.

Melt index (MI) and high load melt index (HLMI) values of the polymer samples are determined in accordance with ASTM D 1238-65T, Conditions E and F, respectively. The ratio of HLMI/MI is recognized as giving an indication of the molecular weight distribution. A higher ratio indicates a broader molecular weight distribution.

Catalyst productivity is calculated by dividing the polymer weight in grams by the catalyst weight in grams. It is conveniently expressed as kg polymer per g catalyst per hour.

The result obtained are given in Table I.

TABLE I

| | | | Ethylene Polymerization, One Hour at 100° C. | | | |
|---|---|---|---|---|---|---|
| Run No. | Catalyst No. | Weight | Polymer Yield g | Calculated Productivity kg/g/hr | Melt Index | HLMI MI |
| 1[d] | 2 | 0.0062 | 345 | 55.6 | 0.51 | 31 |
| 2[c] | 1 | 0.0674 | 171 | 2.54 | —[a] | —[a] |
| 3[c] | 1 + 2 | 0.0559[b] | 392 | 7.01 | 2.8 | 72 |

[a]Too low to measure.
[b]0.0050 g of Catalyst 2 and 0.0509 g of Catalyst1 was premixed and employed giving a weight ratio of about 0.1:1.
[c]Invention run
[d]Control run The results show in invention run 2 that the invention "silica catalyst" is moderately active as an ethylene polymerization catalyst in the presence of hydrogen at 100° C. since about 2.5 kg polyethylene per g catalyst per hour was produced. That the catalyst responds slightly, if at all, to the presence of hydrogen is shown by the lack of polymer flow in the melt index tests. Thus, a high molecular weight polymer was produced by this catalyst.

The high productivity catalyst used in control run 1 is very productive as about 56 kg polyethylene per g catalyst per hour was produced. The polymer had a MI of about 0.5 and a HLMI/MI ratio of about 31 indicating that a relatively narrow molecular weight distribution polymer characteristic or coordination catalysts was produced, however, Such polymers are usefully employed in injection molding applications, for example.

The mixed catalyst of this invention employed in invention run 3 produced polyethylene in the presence of hydrogen at the rate of about 7 kg per g catalyst per hour. The polymer had a melt index of about 3 and the HLMI/MI ratio of about 70 indicated that a broad molecular weight distribution resin was produced. Such resins are usefully employed in blow molding and in film applications, for example.

What is claimed is:

1. A method for producing a catalyst comprising
(1) reacting a first component comprising the product of a reaction between a magnesium dihalide and a tetraalkyl titanate with a second component comprising the product of a reaction between a substantially anhydrous particulate hydroxyl-containing refractory carrier and an organometal compound of a metal of Group I to V and then
(2) reacting the resulting solid with titanium tetrahalide.

2. A method according to claim 1 wherein said tetraalkyl titanate is selected from those tetraalkyl titanates in which the alkyl groups contain 1 to 20 carbon atoms.

3. A method according to claim 2 wherein said organometal compound is selected from organoaluminum compounds of the formula $R_nAlX_{3-n}$ where R is a hydrocarbyl group containing 1 to 20 carbon atoms, X is a halogen, and n is a number in the range of 0 to 3.

4. A method according to claim 3 wherein said substantially anhydrous hydroxyl-containing refractory carrier is selected from the group consisting of alumina, boria, magnesia, silicia, thoria, titania, silica-alumina, and silica titania.

5. A method according to claim 4 wherein said magnesium dihalide comprises magnesium dichloride, said tetraalkyl titanate comprises titanium tetraethoxide, and said hydroxyl-containing refractory carrier comprises silica.

6. A method according to claim 5 wherein said organoaluminum compound is selected from dialkylaluminum chlorides in which the alkyl groups each contain 1 to 6 carbon atoms.

7. A method according to claim 6 wherein said organoaluminum halide comprises diethylaluminum chloride.

8. A method according to claim 7 wherein said titanium tetrahalide comprises titanium tetrachloride.

9. A catalyst produced by the method of any one of claims 1-8.

10. A catalyst according to claim 9 in combination with a second catalyst produced by reacting magnesium dihalide with a tetraalkyl titanate and then reacting a solution of that product with a precipitating agent selected from the group of organoaluminum compounds of the formula $R_nAlX_{3-n}$ where R is a hydrocarbyl group containing 1 to 20 carbon atoms, X is a halogen, and n is a number between 0 and 3, and then treating the resulting solid with a halide ion exchanging source selected from the group consisting of halides of transition metals.

* * * * *